US012096188B2

(12) United States Patent
Yoshimoto et al.

(10) Patent No.: US 12,096,188 B2
(45) Date of Patent: Sep. 17, 2024

(54) AUDIO RECORDER

(71) Applicant: TEAC CORPORATION, Tokyo (JP)

(72) Inventors: Takuya Yoshimoto, Tokyo (JP); Taishi Toyono, Tokyo (JP)

(73) Assignee: TEAC CORPORATION, Tokyo (JP)

( * ) Notice: Subject to any disclaimer, the term of this patent is extended or adjusted under 35 U.S.C. 154(b) by 0 days.

(21) Appl. No.: 18/326,921

(22) Filed: May 31, 2023

(65) Prior Publication Data

US 2023/0308803 A1 Sep. 28, 2023

Related U.S. Application Data

(62) Division of application No. 17/689,416, filed on Mar. 8, 2022, now Pat. No. 11,785,381.

(30) Foreign Application Priority Data

Mar. 10, 2021 (JP) ................................ 2021-038209

(51) Int. Cl.

| | |
|---|---|
| ***H04R 3/00*** | (2006.01) |
| ***H04R 1/04*** | (2006.01) |
| ***H04R 5/027*** | (2006.01) |
| ***H04R 29/00*** | (2006.01) |
| ***H04S 1/00*** | (2006.01) |

(52) U.S. Cl.

CPC ............... *H04R 3/005* (2013.01); *H04R 1/04* (2013.01); *H04R 5/027* (2013.01); *H04R 29/005* (2013.01); *H04S 1/007* (2013.01); *H04S 2400/15* (2013.01)

(58) Field of Classification Search

None

See application file for complete search history.

(56) References Cited

U.S. PATENT DOCUMENTS 9,173,026 B2 10/2015 Ohtsuka
2015/0062425 A1* 3/2015 Matsumoto ............ H04R 1/083 348/375
2018/0262838 A1 9/2018 Ishizaki et al.

FOREIGN PATENT DOCUMENTS

JP 2013-207327 A 10/2013

OTHER PUBLICATIONS

Extended European Search Report, dated Nov. 17, 2022, for European Application No. 22159099.5-1207. (13 pages).

* cited by examiner

*Primary Examiner* — Kenny H Truong
(74) *Attorney, Agent, or Firm* — Seed IP Law Group LLP

(57) ABSTRACT

There is disclosed an audio recorder that automatically determines, when preset microphones are configured to be detachable and different microphones are attached to the same jacks, whether or not the different microphones are in-house microphones, and automatically determines which of the X-Y technique or the A-B technique is used as the attachment technique. Holders in the audio recorder include a switch structure in which, in cases where the different microphones are attached in place of the preset microphones, a contact is turned on only when the different microphones are in-house microphones. Further, a main body unit includes a processor that, when the contact in the switch structure is turned on, automatically determines which of the X-Y technique or the A-B technique is used based on a voltage value of a certain terminal in a plug of the different microphones.

4 Claims, 6 Drawing Sheets

AUDIO RECORDER

CROSS REFERENCE TO RELATED APPLICATION

This application claims priority to Ser. No. 17/689,416 filed on Mar. 8, 2022, which claims priority to Japanese Patent Application No. 2021-038209 filed on Mar. 10, 2021, which is incorporated herein by reference in its entirety including the specification, claims, drawings, and abstract.

TECHNICAL FIELD

The present disclosure relates to an audio recorder.

BACKGROUND

In audio recorders such as a linear PCM recorder, recording is performed by inputting an audio signal using a built-in microphone. Typically, the built-in microphone is, due to its built-in structure, fixed to the device main body and is structurally non-detachable.

Meanwhile, there is an increasing need to configure the built-in microphone to be detachable and attach, in place of the built-in microphone, microphones of other types such as a shotgun microphone and a pin microphone (lavalier microphone), so as to perform various types of recording.

JP 2013-207327 A discloses an audio recording apparatus capable of determining the type of an external sound pickup device connected thereto. The audio recording apparatus comprises: a connection unit that can connect an external sound pickup device and includes a plurality of terminals; and a determination unit that, when a sound pickup device is connected to the connection unit, determines the type of the connected external sound pickup device based on a correlation between signals of certain terminals among the plurality of terminals. JP 2013-207327 A further discloses that the plurality of terminals include a first terminal, a second terminal, and a third terminal, and that, when a correlation between a voltage of the first terminal and a voltage of the second terminal is higher than a first threshold value and a correlation between the voltage of the first terminal and a voltage of the third terminal is higher than a second threshold value, the determination unit determines that the connected external sound pickup device is a certain external sound pickup device.

In configuring a built-in microphone to be detachable and enabling attachment of microphones of other types in place of the built-in microphone, if separate attachment jacks for the microphones of other types are additionally provided on the device main body, the size of the device main body becomes disadvantageously increased by the extent of the addition. In order to avoid the increase in size, it is desirable to configure the built-in microphone to be detachable and also configure such that the same jack allows attachment of the microphones of other types (which may be microphones produced in-house or by other companies).

Here, since a voltage that should be supplied to a microphone is frequently different for an in-house microphone and for a microphone of another company, it is necessary to determine which one of an in-house microphone or another company's microphone is attached.

Further, in cases where in-house microphones are attached, the orientation of the microphones is different according to the X-Y technique employing an inward facing arrangement, in contrast to according to the A-B technique employing an outward facing arrangement. For this reason, when using the X-Y technique, a problem occurs in that the stereo L and R channels become reversed.

SUMMARY

The present disclosure is directed to determining, in cases where built-in microphones are configured to be detachable and different microphones are attached to the same jacks, whether or not the different microphones are in-house microphones. The present disclosure is further directed to automatically identifying which of the X-Y technique or the A-B technique is used as the attachment technique, and correctly setting the stereo L and R channels in either cases of using the X-Y technique or the A-B technique as the attachment technique.

According to one aspect, the present disclosure relates to an audio recorder including: a main body unit; microphones provided detachably on the main body unit; and holders for detachably holding the microphones in a manner capable of switching between an X-Y technique employing an inward facing arrangement in which sound pickup axes of the microphones intersect each other, and an A-B technique employing an outward facing arrangement in which the sound pickup axes of the microphones do not intersect each other. The holders include a switch structure in which, in cases where different microphones are attached in place of the microphones, a contact is turned on only when the different microphones are in-house microphones. The main body unit includes a determination circuit that, when the contact in the switch structure is turned on, automatically determines which of the X-Y technique or the A-B technique is used based on a voltage value of a certain terminal in a plug of the different microphones.

In one embodiment of the present disclosure, the holders have a hole that is engageable with a boss on one of the different microphones only when the one of the different microphones is attached in a first orientation, and have a hole that is engageable with a boss on the other one of the different microphones only when the other one of the different microphones is attached in a second orientation different from the first orientation.

In another embodiment of the present disclosure, the different microphones have a microphone plate facing a fixed direction.

In a further embodiment of the present disclosure, an S terminal in either one of plugs of the different microphones is set to 0 V, and when the contact in the switch structure is turned on, the determination circuit automatically determines which of the X-Y technique or the A-B technique is used based on the S terminal being at 0 V.

In a further embodiment of the present disclosure, when the X-Y technique is automatically determined, the determination circuit automatically reverses the stereo R channel audio signal and L channel audio signal.

According to another aspect, the present disclosure relates to an audio recorder including detachable microphones and a processor, wherein the processor reads out and executes a program so as to: detect attachment of the microphones; determine whether the attached microphones are those produced in-house or by another company; and automatically determine, when the attached microphones are those produced in-house, which of an X-Y technique or an A-B technique is used, wherein the X-Y technique employs an inward facing arrangement in which sound pickup axes of the microphones intersect each other, and the A-B technique employs an outward facing arrangement in which the sound pickup axes of the microphones do not intersect each other.

In one embodiment of the present disclosure, the processor automatically determines which of the X-Y technique or the A-B technique is used based on a voltage value of a certain terminal in a plug of the microphones.

In a further embodiment of the present disclosure, an S terminal in either one of plugs of the microphones is set to 0 V, and the processor automatically determines which of the X-Y technique or the A-B technique is used based on the S terminal being at 0 V.

In a further embodiment of the present disclosure, when the X-Y technique is automatically determined, the processor automatically reverses the stereo R channel audio signal and L channel audio signal.

According to the present disclosure, in cases where built-in microphones are configured to be detachable and different microphones are attached to the same jacks, it is possible to determine whether or not the different microphones are in-house microphones.

Further, it is possible to automatically determine which of the X-Y technique or the A-B technique is used as the attachment technique.

Furthermore, the stereo L and R channels can correctly be set in either case, of using the X-Y technique or the A-B technique as the attachment technique.

BRIEF DESCRIPTION OF DRAWINGS

Embodiment(s) of the present disclosure will be described based on the following figures, wherein.

DESCRIPTION OF EMBODIMENTS

Embodiments of the present disclosure will now be described by reference to the drawings.

Figure 1A:
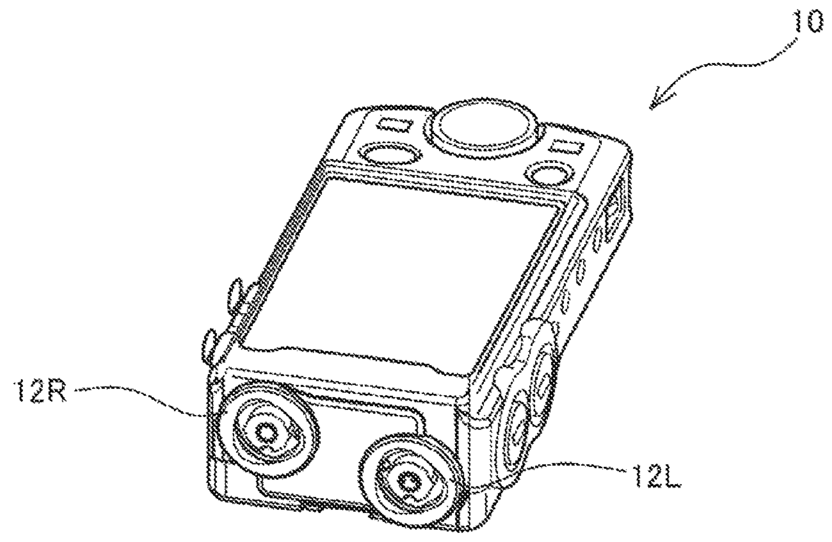
FIG. 1A is an external perspective view of an audio recorder with preset microphones removed.
Figure 1B:
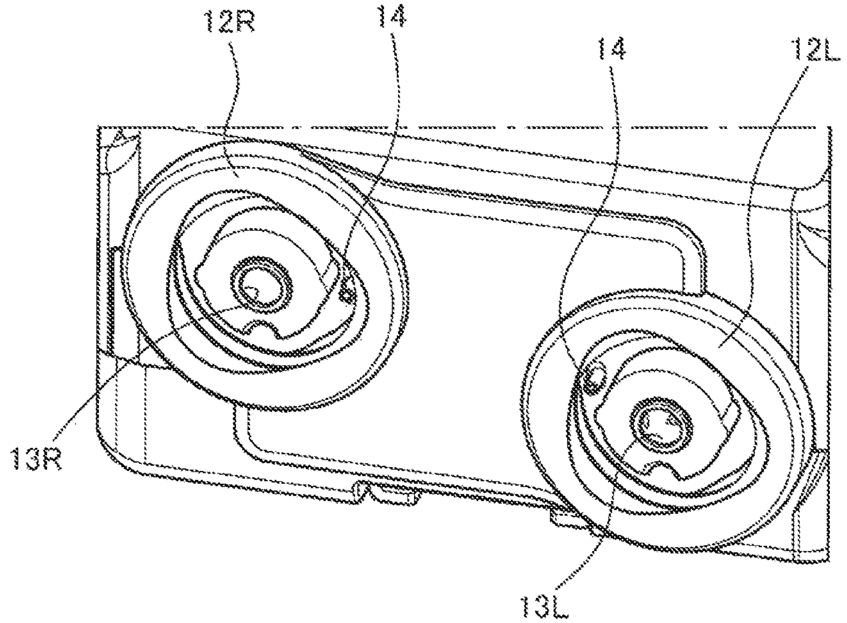
FIG. 1B is a partial enlarged view of the front face part in FIG. 1A.

An external perspective view of an audio recorder 10 is shown in FIGS. 1A and 1B. FIG. 1A is an external perspective view showing a state in which preset microphones are removed from the device main body, and FIG. 1B is a partial enlarged view of the front face part of the device main body.

The audio recorder 10 is a small-sized portable recorder, and comprises a main body unit and a pair of left and right microphones. The audio recorder 10 has a recording function of recording audio input via the pair of microphones, and a reproduction function of reproducing the recorded audio. The main body unit is formed in a substantially cuboid shape having six faces, and the pair of left and right microphones are provided at one of the faces that oppose each other in the lengthwise direction.

When the audio recorder 10 has a shape as described above, its regular position is generally a position in which the lengthwise direction of the main body unit is oriented horizontally and the pair of left and right microphones are directed toward the audio source. Concerning upper and lower faces that oppose each other in the height direction when the main body unit is placed in the regular position, the upper face is defined as a top face of the main body unit, while the lower face is defined as a bottom face. Further, the side face at which the pair of left and right microphones are attached is defined as a front face. FIG. 1A illustrates a state in which the pair of preset left and right microphones attached to the front face are removed, and shows holders 12R and 12L for supporting the preset microphones.

At the top face of the main body unit, a manipulation unit and a display unit are provided. The manipulation unit includes, for example, a record button, a play button, a stop button, a select button, a cursor move button, and the like. The cursor move button causes movement of a cursor on a manipulation screen displayed on the display unit, and is used for selecting various menu items, for selecting folders having audio data stored therein, and so on.

The display unit is, for example, an LCD (liquid crystal display), and displays a file name or a folder name of audio being recorded or reproduced, a sound volume level at the time of reproduction, a manipulation screen for carrying out various settings, and the like. At left and right side faces, a dial for adjusting the sound volume, a jack for attaching an earphone, a card slot for inserting a memory card for storing data, and the like, are provided.

As shown in FIG. 1B, at the front face of the main body unit, a pair of holders 12R and 12L for detachably holding the pair of microphones are provided. The microphones to be attached to the holders 12R, 12L may be produced in-house or by another company, and may be a shotgun microphone or a lavalier microphone. Accordingly, a user of the audio recorder can remove the preset microphones attached at the time of purchase and instead attach, for example, lavalier microphones produced by another company to the holders 12R, 12L.

Each of the pair of holders 12R, 12L is formed to have a circular outer shape. At the respective center positions in the pair of holders 12R, 12L, jacks 13R and 13L are formed, into which respective plugs of the pair of microphones are inserted. The holders 12R, 12L support the attached pair of microphones with their sound pickup axes being inclined relative to the direction perpendicular to the front face. In the front face, the holders 12R, 12L are arranged off-center so as to be shifted away from each other in the height direction. According to this off-center arrangement, even when the pair of microphones are attached in an inward facing arrangement according to the X-Y technique, housings of the pair of microphones can be crossed over each other without interfering with each other.

Further, at a predetermined position in each holder 12R, 12L, or more specifically, at a position that is abutted by at least a portion of an in-house microphone when the plug of the in-house microphone is inserted into the jack and the in-house microphone is thereby attached, a detection switch 14 is provided, which is urged by a compression spring in the direction of the opening of the holder 12R, 12L and projects from the face of the holder 12R, 12L as described further below. Although the detection switches 14 in the drawings are respectively provided at a position in the holder 12R on the side opposite the holder 12L and at a position in the holder 12L on the side opposite the holder 12R, the position, shape, and number of the detection switches 14 can be set arbitrarily. In other words, it is sufficient so long as each detection switch 14 is provided at a position that is engaged only when an in-house microphone is attached and the engagement is carried out by a portion of the in-house microphone. Alternatively, to the contrary, each detection switch 14 may be provided at a position that is engaged only when a microphone produced by another company is attached and the engagement is carried out by a portion of the microphone produced by another company.

Figure 2:
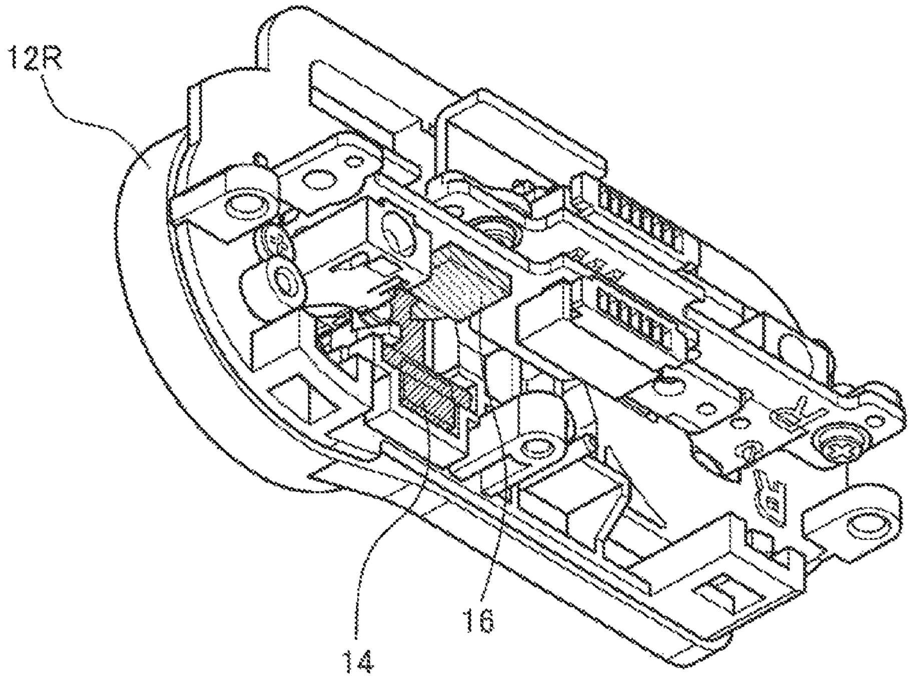
FIG. 2 is an internal perspective view of a holder in the audio recorder.

FIG. 2 is a perspective view of the holder 12R from its rear side. Since the structure of the holder 12L is identical, description thereof will not be given.

The detection switch 14 is provided at a predetermined position in the holder 12R. In the vicinity of the detection switch 14, or more specifically, immediately below the main body unit side of the detection switch 14, a sensing switch 16 for sensing an in-house microphone is arranged. The sensing switch 16 comprises a main body and a projection, and the projection extends from the main body toward the detection switch 14 to abut on the detection switch 14.

At the time of attaching an in-house microphone, a portion of the in-house microphone, which may, for example, be a bottom face where the plug is provided, abuts on the detection switch 14 and presses the detection switch 14 toward the main body unit. The pressing movement of the detection switch 14 causes the projection of the sensing switch 16 to be pressed and thereby causes the sensing switch 16 in an OFF state to turn ON.

Figure 3:
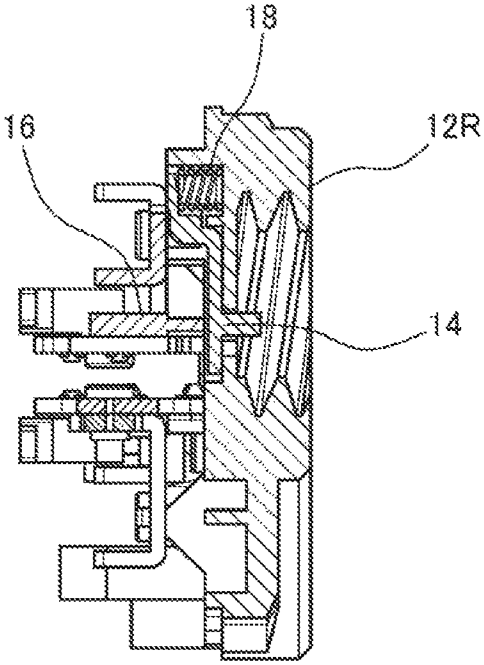
FIG. 3 is a cross-sectional view of the holder in the audio recorder (before attaching a microphone)
Figure 4:
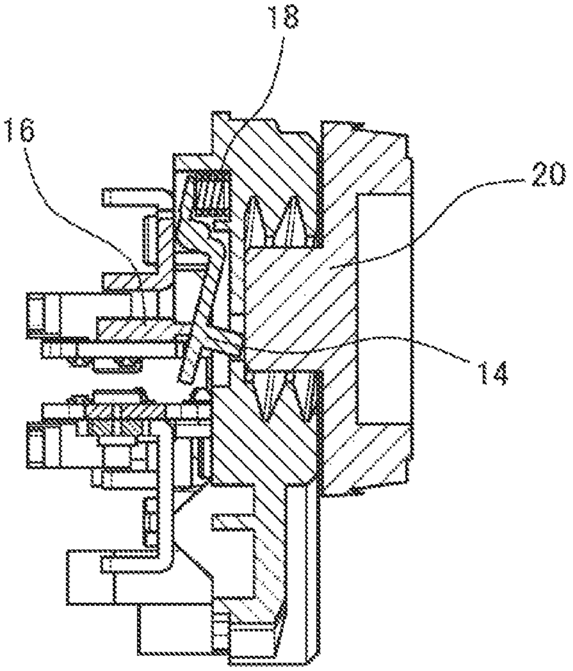
FIG. 4 is a cross-sectional view of the holder in the audio recorder (after attaching a microphone)

FIGS. 3 and 4 show a cross-sectional view of the holder 12R that passes through the detection switch 14 of the holder 12R. As shown in FIG. 3, the detection switch 14 is provided extending from a location near the center to a peripheral portion of the holder 12R. A first end part of the detection switch 14 located at the peripheral portion is pivotably supported at an axis, and the other end part located toward the center has formed thereon a projection projecting toward the opening of the holder 12R. The first end part pivotably supported at an axis is urged by a compression spring 18 toward a side opposite to the holder 12R opening side, and by means of the reaction force, the projection provided at the other end part located toward the center is urged to the opening side, so that the position of the detection switch 14 is maintained. When in the state in which the projection of the detection switch 14 is urged to the opening side (i.e., in a state before attaching a microphone), the sensing switch 16 is in the OFF state.

When, as shown in FIG. 4, a plug of an in-house microphone is inserted into the jack 13R (in FIGS. 3 and 4, the jack 13R is located out of the page along the direction perpendicular to the page surface) while in the state shown in FIG. 3 and the in-house microphone is thereby attached, a portion 20 of the in-house microphone abuts on and presses the projection of the detection switch 14, and causes the detection switch 14 to swing toward the main body side with the first end part serving as the axis. As a result of this swing movement of the detection switch 14, the detection switch 14 presses the sensing switch 16 toward the main body unit and causes the sensing switch 16 in the OFF state to turn ON. A processor (not shown in the drawings) provided in the main body unit functions as a determination circuit by reading out and executing a program incorporated in advance, and when the processor detects that a plug is inserted into the jack 13R and that the state of the sensing switch 16 has changed from OFF to ON, the processor determines that an in-house microphone is attached to the holder 12R.

On the other hand, when a plug of a microphone produced by another company is inserted into the jack 13R and this another company's microphone is thereby attached, the other company's microphone and the projection of the detection switch 14 do not come into contact with each other, so that the detection switch 14 is not pressed toward the main body side, and the sensing switch 16 is maintained in the OFF state. When the processor provided in the main body unit detects that a plug is inserted into the jack 13R and that the state of the sensing switch 16 is maintained in the OFF state, the processor determines that a microphone produced by another company is attached to the holder 12R.

Upon detecting attachment of an in-house microphone, the processor in the main body unit supplies a voltage of 5 V to a certain terminal in the plug, which may for example be a R1 terminal among four terminals (S terminal, R1 terminal, R2 terminal, and T terminal). Further, upon detecting attachment of another company's microphone, the processor supplies a voltage of 2.7 V to the T terminal. Here, the T (tip) terminal, R1 and R2 (ring) terminals, and S (sleeve) terminal are arranged sequentially on the plug from the tip to the base. In general, R channel (reversed phase), R channel (normal phase), L channel (normal phase), and L channel (reversed phase) are assigned sequentially from the tip of the plug. The processor in the main body unit supplies a voltage for an in-house microphone when both of the jacks 13R, 13L of the holders 12R, 12L have received insertion of plugs of in-house microphones, and supplies a voltage for another company's microphone when at least one of the jacks 13R, 13L of the holders 12R, 12L has received insertion of a plug of another company's microphone.

As such, in the present embodiment, whether an attached microphone is an in-house microphone or another company's microphone is determined based on the ON/OFF state of the sensing switch 16. Further, by supplying a voltage that is exclusively for an in-house microphone to an in-house microphone and supplying a voltage that is exclusively for another company's microphone to another company's microphone, it is possible to reliably prevent a situation of, for example, damaging a microphone by supplying an incorrect voltage to another company's microphone.

Next, description will be given regarding a configuration for automatically determining, when an attached microphone is an in-house microphone, which of the X-Y technique employing an inward facing arrangement or the A-B technique employing an outward facing arrangement is being used to attach the microphone.

Figure 5:
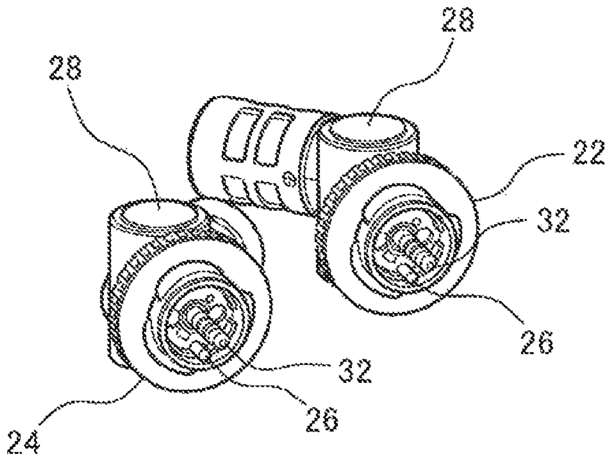
FIG. 5 is an external perspective view of in-house microphones to be attached to the audio recorder.

FIG. 5 shows a perspective view of a pair of in-house microphones 22 and 24 to be attached to the holders 12R, 12L at the front face of the main body unit. Each of the pair of microphones 22, 24 comprises a diaphragm and a housing that houses the diaphragm, and picks up sound using the diaphragm. The housing has a substantially cylindrical shape, and the diaphragm is formed integrally as one unit with components such as a transducer for converting vibration of the diaphragm into an electric signal. On the open end side of the housing, there is provided a head cover that may, for example, be composed of a metal mesh plate or the like and serves to protect the diaphragm located inside.

Each of the pair of microphones 22, 24 further comprises a microphone plate 28. The microphone plate 28 has a substantially circular shape, and in each of the pair of microphones 22, 24, the microphone plate 28 is provided facing a single direction. Specifically, in the microphone 22, the microphone plate 28 is provided such that, when the microphone 22 is positioned to show the shape of “>” in plan view, the microphone plate 28 faces the upper face side, and in the microphone 24, the microphone plate 28 is provided such that, when the microphone 24 is positioned to show the shape of “<” in plan view, the microphone plate 28 faces the upper face side. In other words, the respective microphone plates 28 are provided to face the top face side of the main body unit when the microphone 22 is arranged on the right side, the microphone 24 is arranged on the left side, and the microphones 22, 24 are attached according to the X-Y technique employing an inward facing arrangement. Alternatively stated, the respective microphone plates 28 are provided to face the top face side of the main body unit when the microphone 22 is arranged on the left side, the microphone 24 is arranged on the right side, and the microphones 22, 24 are attached according to the A-B technique employing an outward facing arrangement.

Further, a boss 26 is provided at a predetermined position in an attaching part of each of the pair of microphones 22, 24. At the time of attachment to the main body unit, the boss 26 is aligned with and inserted into a microphone orientation determining hole provided at a corresponding position in the holder 12R, 12L, so as to carry out the attachment.

Figure 6:
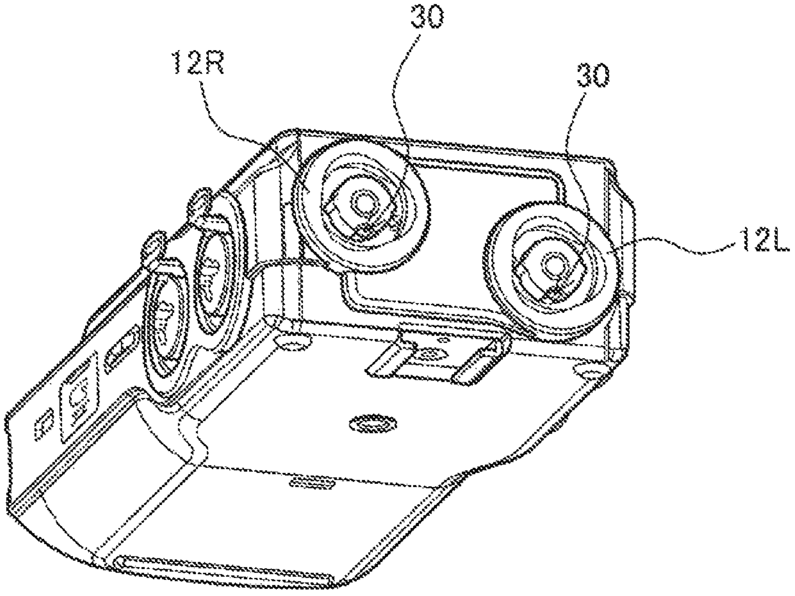
FIG. 6 is an external perspective view of the audio recorder.

FIG. 6 shows an example of microphone orientation determining holes 30 provided at predetermined positions in the holders 12R, 12L. At the time of attachment, the pair of microphones 22, 24 are held such that the microphone plates 28 face the top face side of the main body unit, and the bosses 26 of the microphones 22, 24 are aligned with the microphone orientation determining holes 30. Then, the attachment is carried out by inserting the respective plugs into the jacks 13R, 13L while inserting the bosses 26 into the microphone orientation determining holes 30. If an attempt is made to attach the pair of microphones 22, 24 by holding the microphones 22, 24 such that the microphone plates 28 face the rear face side opposite to the top face side of the main body unit, the bosses 26 would not advance into the microphone orientation determining holes 30, so that the attachment cannot be carried out.

The bosses 26 on the microphones 22, 24 are provided at positions identical to each other, and the microphone orientation determining holes 30 in the holders 12R, 12L are also provided at positions that are identical to each other. Accordingly, the microphone 22 attachable to the holder 12R in a certain orientation can alternatively be attached to the holder 12L while maintaining the same orientation. Similarly, the microphone 24 attachable to the holder 12L in a certain orientation can alternatively be attached to the holder 12R while maintaining the same orientation.

Figure 7:
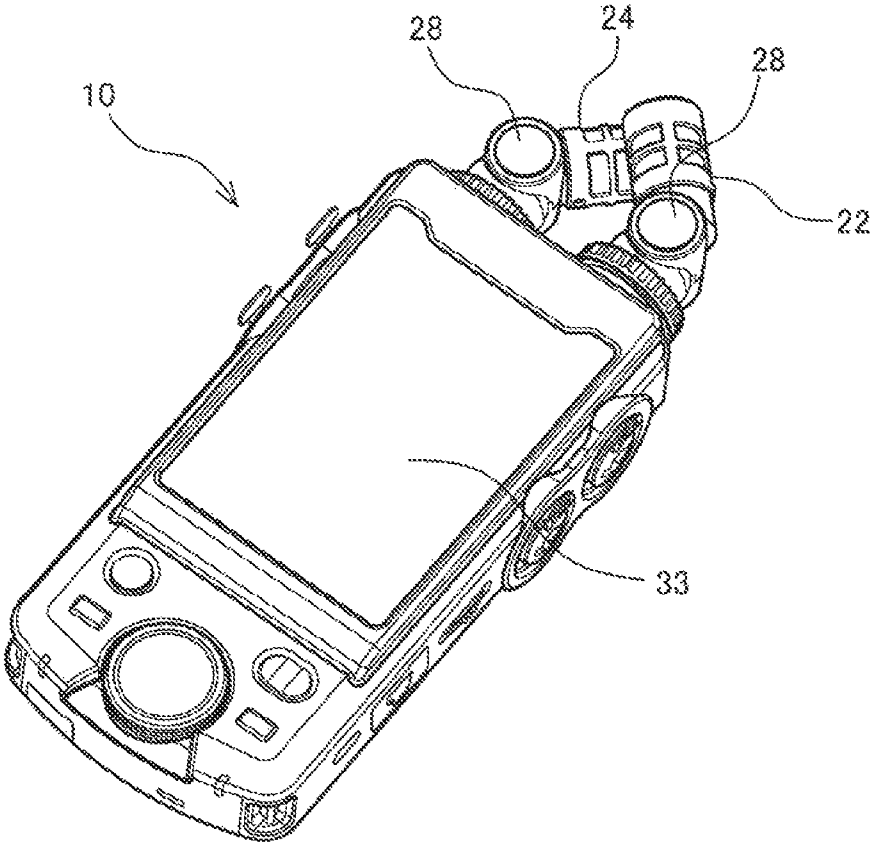
FIG. 7 is an external perspective view of the audio recorder with in-house microphones attached (according to the X-Y technique)

FIG. 7 shows a state in which, among the pair of microphones 22, 24, the microphone 22 is attached to the holder 12R and the microphone 24 is attached to the holder 12L. The X-Y technique employing an inward facing arrangement is used, according to which the respective microphone plates 28 of the pair of microphones 22, 24 face the top face 33 side of the main body unit, and the sound pickup axes intersect each other.

Figure 8:
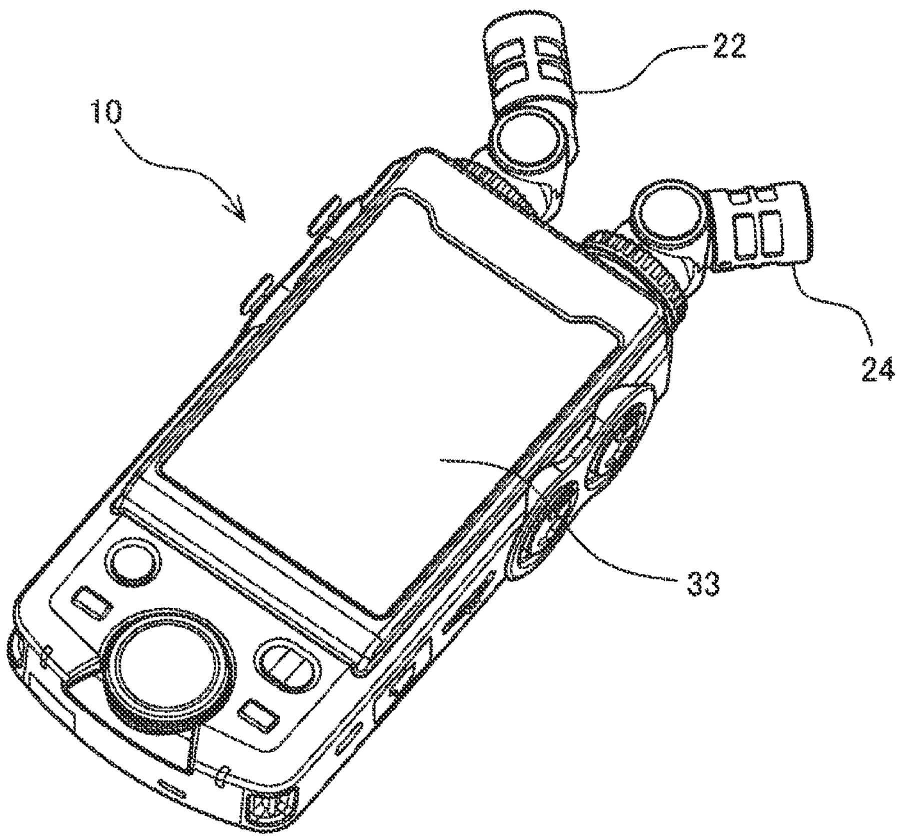
FIG. 8 is an external perspective view of the audio recorder with in-house microphones attached (according to the A-B technique)

Further, FIG. 8 shows a state in which, among the pair of microphones 22, 24, the microphone 22 is attached to the holder 12L and the microphone 24 is attached to the holder 12R. The A-B technique employing an outward facing arrangement is used, according to which the respective microphone plates 28 of the pair of microphones 22, 24 face the top face 33 side of the main body unit, and the sound pickup axes do not intersect each other.

The processor in the main body unit automatically determines whether the pair of microphones are attached according to the X-Y technique shown in FIG. 7 or according to the A-B technique shown in FIG. 8, based on a value of terminal voltage of the microphones 22, 24.

Specific details are as described below. The S terminal among the four terminals (S terminal, R1 terminal, R2 terminal, and T terminal) formed in the plug of either one of the pair of microphones 22, 24, which may for example be the microphone 22, is set to open, and the S terminal among the four terminals (S terminal, R1 terminal, R2 terminal, and T terminal) formed in the plug of the other one of the pair of microphones 22, 24, which may for example be the microphone 24, is set to 0 V. The processor reads off an S terminal voltage value when the plugs of the microphones 22, 24 are inserted into and attached to the jacks 13R, 13L. When the voltage of the S terminal of the microphone attached to the holder 12L is read off and the read-off voltage value is 0 V, this indicates that the microphone 24 is attached to the holder 12L, so that the processor determines that the inward facing X-Y technique shown in FIG. 7 is used. On the other hand, when the voltage of the S terminal of the microphone attached to the holder 12R is read off and the read-off voltage value is 0 V, this indicates that the microphone 24 is attached to the holder 12R, so that the processor determines that the outward facing A-B technique shown in FIG. 8 is used.

It is naturally possible to set the S terminal of the microphone 22 to 0 V, instead of the S terminal of the microphone 24. In that case, when the voltage of the S terminal of the microphone attached to the holder 12R is read off and the read-off voltage value is 0 V, this indicates that the microphone 22 is attached to the holder 12R, so that the processor determines that the inward facing X-Y technique shown in FIG. 7 is used. On the other hand, when the voltage of the S terminal of the microphone attached to the holder 12L is read off and the read-off voltage value is 0 V, this indicates that the microphone 22 is attached to the holder 12L, so that the processor determines that the outward facing A-B technique shown in FIG. 8 is used.

In summary, only the S terminal of either one of the microphones 22, 24 is set to 0 V, and based on in which of the jacks 13R, 13L has an S terminal voltage value of 0 V, the processor automatically determines which of the X-Y technique or the A-B technique is used.

Figure 9:
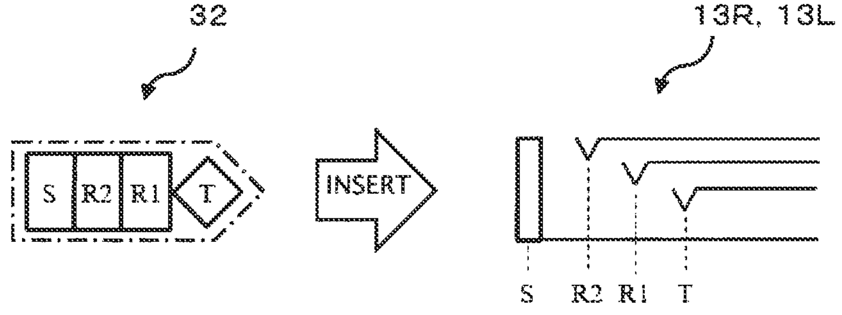
FIG. 9 is a schematic diagram showing plug terminals of an in-house microphone and a circuit board on the main body side.

FIG. 9 schematically illustrates the four terminals (S terminal, R1 terminal, R2 terminal, and T terminal) in the plug 32 of each microphone 22, 24, and the jack 13R, 13L on the holder 12R, 12L side. The voltage value of the S terminal in the plug 32 of the microphone 22, 24 is read by a voltage detection circuit (not shown in the drawings) provided on the jack 13R, 13L side and output to the processor, and the processor detects whether or not the voltage value is 0 V. When the S terminal of either one of the microphones 22, 24, which may, for example, be the microphone 24, is set to 0 V, to which jack (or holder) the microphone 24 is attached can be determined based on in which of the jacks 13R, 13L has the S terminal voltage value of 0 V, and it is thereby possible to uniquely determine which of the X-Y technique employing the inward facing arrangement or the A-B technique employing the outward facing arrangement is used.

Next, the processor sets audio signals by automatically switching the audio signals of the R channel and the L channel with each other for the X-Y technique and for the A-B technique. Specifically, stereo recording is performed according to the A-B technique shown in FIG. 8 by using, as an L channel audio signal, an audio signal picked up by the microphone 22 using the holder 12L as the holder for the L-channel, and by using, as an R channel audio signal, an audio signal picked up via the microphone 24 using the holder 12R as the holder for the R-channel. Subsequently, when the user switches the microphones 22, 24 with each other and shifts to the X-Y technique shown in FIG. 7, the processor automatically determines that a change from the A-B technique to the X-Y technique has occurred, and reverses the R channel audio signal and the L channel audio signal in recorded data. That is, signal reversal is executed so that an audio signal from the holder 12R is used as the L channel audio signal, and an audio signal from the holder 12L is used as the R channel audio signal.

If this processing of reversing the R channel audio signal and the L channel audio signal is not executed, recording would be performed by using an audio signal from the holder 12R as the R channel audio signal and using an audio signal from the holder 12L as the L channel audio signal. As a result, an audio signal picked up via the microphone 22 would incorrectly be used as the R channel audio signal, and an audio signal picked up via the microphone 24 would incorrectly be used as the L channel audio signal.

In contrast, by automatically executing the signal reversal so that an audio signal from the holder 12R is used as the L channel audio signal and an audio signal from the holder 12L is used as the R channel audio signal, even after the A-B technique shown in FIG. 8 is switched to the X-Y technique shown in FIG. 7, recording can be performed while an audio signal picked up by the microphone 22 remains used as the L channel audio signal and an audio signal picked up by the microphone 24 remains used as the R channel audio signal.

Figure 10:
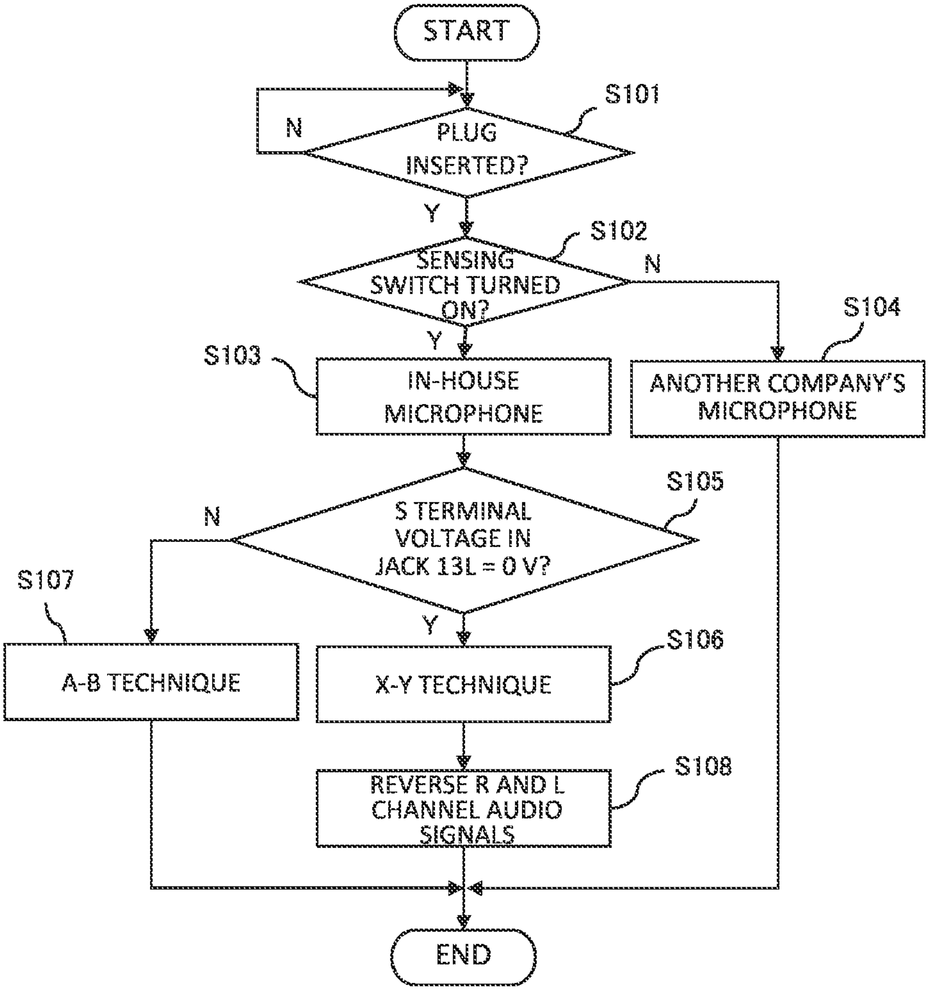
FIG. 10 is a flowchart of a process performed by a processor of the audio recorder.

FIG. 10 shows a flowchart of a process performed by the processor in the main body unit. This process relates to a case in which the S terminal of the microphone 24, among the microphones 22, 24, is set to 0 V. The processor performs the process shown in FIG. 10 by reading out and executing a program. The processor may be composed of one or more CPUs.

First, the processor determines whether or not plugs are inserted into the jacks 13R, 13L of the holders 12R, 12L (S101). The processor may detect insertion of plugs into the jacks using an arbitrary configuration, which may, for example, be a switch structure in which a switch contact on the jack side is normally closed and is opened when a plug is inserted.

When a plug is inserted (YES in S101), the processor detects that a different microphone is attached in place of a preset microphone, and determines whether or not the sensing switch 16 is turned on (S102).

When the sensing switch 16 is turned on (YES in S102), the processor detects that an in-house microphone is attached. When the sensing switch 16 remains in the OFF state (NO in S102), the processor detects that another company's microphone is attached.

When in-house microphones are detected, the processor determines whether or not the voltage value of the S terminal in the jack 13L of the holder 12L is 0 V (S105). When the voltage value of the S terminal in the jack 13L is 0 V (YES in S105), this means that the microphone 24 is inserted into the jack 13L, and therefore the processor determines that the X-Y technique is used (S106). On the other hand, when the voltage value of the S terminal in the jack 13L is not 0 V, that is, when the voltage value of the S terminal in the jack 13R is 0 V (NO in S105), this means that the microphone 24 is inserted into the jack 13R, and therefore the processor determines that the A-B technique is used (S107).

When use of the X-Y technique is detected, the processor performs a recording process by executing the signal reversal so that an audio signal from the jack 13R is used as the L channel audio signal and an audio signal from the jack 13L is used as the R channel audio signal (S108).

As described above, in the present embodiment, it is possible to determine whether a microphone attached to the main body unit is one produced in-house or by another company, so that even when a voltage to be supplied is different for an in-house microphone and for another company's microphone, a situation of supplying an incorrect voltage can be prevented.

Further, when in-house microphones are attached, it is possible to automatically determine which of the X-Y technique employing the inward facing arrangement, or the A-B technique employing the outward facing arrangement, is used.

Furthermore, at the time of automatically determining which of the X-Y technique employing the inward facing arrangement or the A-B technique employing the outward facing arrangement is used, it is also possible to correctly set the stereo R channel and L channel.

In the present embodiment, in cases where microphones attached to the holders 12R, 12L are another company's microphones, the step of automatically determining which of the X-Y technique or the A-B technique is used is not performed. In those cases, the processor may display a menu on the manipulation unit to allow the user to manually designate which of the X-Y technique or the A-B technique is used.

The invention claimed is:

1. An audio recorder, comprising
detachable microphones; and
a processor,
wherein the processor reads out and executes a program so as to:
detect attachment of the microphones;
determine whether the attached microphones are those produced in-house or by another company; and
automatically determine, when the attached microphones are those produced in-house, which of an X-Y technique or an A-B technique is used, wherein the X-Y technique employs an inward facing arrangement in which sound pickup axes of the microphones intersect each other, and the A-B technique employs an outward facing arrangement in which the sound pickup axes of the microphones do not intersect each other.

2. The audio recorder according to claim 1, wherein
the processor automatically determines which of the X-Y technique or the A-B technique is used based on a voltage value of a certain terminal in a plug of the microphones.

3. The audio recorder according to claim 2, wherein
an S terminal in either one of plugs of the microphones is set to 0 V, and
the processor automatically determines which of the X-Y technique or the A-B technique is used based on the S terminal being at 0 V.

4. The audio recorder according to claim 1, wherein
when the X-Y technique is automatically determined, the processor automatically reverses a stereo R channel audio signal and L channel audio signal.

* * * * *